US009380715B2

(12) United States Patent
Chiang et al.

(10) Patent No.: US 9,380,715 B2
(45) Date of Patent: Jun. 28, 2016

(54) SUPPORTING MECHANISM FOR SUPPORTING A DISPLAY MODULE ON A BASE AND PORTABLE ELECTRONIC DEVICE THEREWITH

(71) Applicant: Wistron Corporation, New Taipei (TW)

(72) Inventors: Shu-Chen Chiang, New Taipei (TW); Wen-Chin Wu, New Taipei (TW); Tian-Shyang Lin, New Taipei (TW); Pin-Hsien Su, New Taipei (TW); Ming-Hua Hung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 374 days.

(21) Appl. No.: 13/910,130

(22) Filed: Jun. 5, 2013

(65) Prior Publication Data

US 2013/0329375 A1 Dec. 12, 2013

(30) Foreign Application Priority Data

Jun. 8, 2012 (TW) .............................. 101120667 A

(51) Int. Cl.
*G06F 1/16* (2006.01)
*H05K 5/00* (2006.01)

(52) U.S. Cl.
CPC .............. *H05K 5/0017* (2013.01); *G06F 1/162* (2013.01); *G06F 1/1618* (2013.01); *G06F 1/1679* (2013.01)

(58) Field of Classification Search
CPC ....... G06F 1/1616; G06F 1/1618; G06F 1/62; G06F 1/1675; G06F 1/1679; H05K 5/0017
USPC ............. 361/679.02, 679.21, 679.26–679.28, 361/679.58, 679.55, 679.56; 455/575.3, 455/575.4
See application file for complete search history.

(56) References Cited

U.S. PATENT DOCUMENTS 5,764,478 A * 6/1998 Ohgami et al. .......... 361/679.09
6,142,593 A * 11/2000 Kim et al. ................. 312/223.2

(Continued)

FOREIGN PATENT DOCUMENTS

| TW | I243037 | 11/2005 |
| TW | 200644771 | 12/2006 |
| TW | 200741423 | 11/2007 |

OTHER PUBLICATIONS

Office action mailed on Apr. 14, 2015 for the Taiwan application No. 101120667, filing date: Jun. 8, 2012, p. 1 line 11-14, p. 2-9 and p. 10 line 1-9.

(Continued)

*Primary Examiner* — Adam B Dravininkas
(74) *Attorney, Agent, or Firm* — Winston Hsu; Scott Margo

(57) ABSTRACT

A supporting mechanism for supporting a display module on a base includes a stand and a buckling structure. An end of the stand is pivoted to the base, and the buckling structure is pivoted to the other end of the stand and for buckling the display module. The buckling structure includes a housing, at least one buckling component and at least one resilient component. The housing is pivoted to the other end of the stand. The at least one buckling component is movably installed in the housing. The at least one resilient component is installed inside the housing and connected to the at least one buckling component. The at least one resilient component drives the at least one buckling component to buckle a fastening portion of the display module as the housing and the at least one buckling component are inserted into a containing portion on the display module.

16 Claims, 13 Drawing Sheets

(56) References Cited

U.S. PATENT DOCUMENTS

| | | | |
|---|---|---|---|
| 2003/0198008 A1* | 10/2003 | Leapman | G06F 1/1616 361/679.29 |
| 2004/0168469 A1 | 9/2004 | Tetu | |
| 2004/0259593 A1* | 12/2004 | Wang et al. | 455/556.1 |
| 2005/0052834 A1* | 3/2005 | Tanaka et al. | 361/681 |
| 2005/0057894 A1* | 3/2005 | Kim | G06F 1/1616 361/679.27 |
| 2005/0078444 A1* | 4/2005 | Hong | G06F 1/162 361/679.06 |
| 2005/0099765 A1* | 5/2005 | Wang | G06F 1/162 361/679.06 |
| 2005/0128690 A1* | 6/2005 | Chuang | G06F 1/162 361/679.06 |
| 2005/0168925 A1* | 8/2005 | Fang | G06F 1/1632 361/679.07 |
| 2005/0185367 A1* | 8/2005 | Chuang | G06F 1/1679 361/679.06 |
| 2005/0207102 A1* | 9/2005 | Russo | G06F 1/1601 361/679.27 |
| 2006/0002062 A1* | 1/2006 | Kwon | G06F 1/1679 361/679.58 |
| 2006/0114650 A1* | 6/2006 | Wang | G06F 1/162 361/679.09 |
| 2006/0288258 A1 | 12/2006 | Lo | |
| 2007/0152113 A1 | 7/2007 | Okuley | |
| 2008/0001507 A1* | 1/2008 | Martin-Otto | 312/223.2 |
| 2009/0027837 A1* | 1/2009 | Cho et al. | 361/679.01 |
| 2010/0039764 A1* | 2/2010 | Locker | G06F 1/1615 361/679.29 |
| 2010/0172081 A1* | 7/2010 | Tian | G06F 1/1632 361/679.29 |
| 2011/0199727 A1* | 8/2011 | Probst | G06F 1/1628 361/679.09 |
| 2012/0293938 A1* | 11/2012 | Dai et al. | 361/679.07 |

OTHER PUBLICATIONS

Office action mailed on Mar. 4, 2016 for the China application No. 201210201575.0, p. 3 line 5~36, p. 4~8 and p. 9 line 1~19.

* cited by examiner

SUPPORTING MECHANISM FOR SUPPORTING A DISPLAY MODULE ON A BASE AND PORTABLE ELECTRONIC DEVICE THEREWITH

BACKGROUND OF THE INVENTION

1. Field of the Invention

The present invention relates to a supporting mechanism and a portable electronic device therewith, and more particularly, to a supporting mechanism for supporting a display module on a base and a portable electronic device therewith.

2. Description of the Prior Art

A conventional tablet computer utilizes a touch panel for touch control. Since the tablet computer can not completely meet user's demands for convenience, a portable computer device combined with a supporting base equipped with a keyboard and a tablet computer arises. Generally speaking, mechanical designs for combining the supporting base and the tablet computer are categorized as an external type, a socket type or a fixing type. The external type and the socket type facilitate a user to freely choose whether to bring the supporting base or not, while it disadvantages combination. The fixing type facilitates the combination, while it disadvantages portability due to disability to separate the tablet computer. Mechanisms capable of facilitating separability and combination become an issue in the portable electronic device industry.

SUMMARY OF THE INVENTION

The present invention provides a supporting mechanism for supporting a display module on abase and a portable electronic device therewith for solving above drawbacks.

According to the claimed invention, a supporting mechanism for supporting a display module on a base is disclosed. The display module includes at least one fastening portion, and the supporting mechanism includes a stand and a buckling structure. An end of the stand is pivoted to the base. The buckling structure is pivoted to the other end of the stand for buckling the display module. The buckling structure includes a housing, at least one buckling component and at least one resilient component. The housing is pivoted to the other end of the stand. The at least one buckling component is movably installed in the housing. The at least one resilient component is installed inside the housing and connected to the at least one buckling component. The at least one resilient component drives the at least one buckling component to buckle a fastening portion of the display module when the housing and the at least one buckling component are inserted into a containing portion on the display module.

According to the claimed invention, at least one sliding slot is formed on the at least one buckling component, and the base includes at least one guiding track disposed inside the at least one sliding slot for guiding a movement of the at least one buckling component.

According to the claimed invention, the at least one resilient component is a torsion spring with a bending portion sheathing on a positioning post on an inner side of the housing, and two ends of the torsion spring are respectively fixed on the at least one buckling component and the inner side of the housing.

According to the claimed invention, an amount of the at least one fastening portion is two, and the buckling structure includes two buckling components movably installed on two sides of the housing. The buckling structure includes two resilient components respectively connected the two buckling components. The containing portion is a sunken portion. Each of the resilient components drives the corresponding buckling component to buckle the two fastening portions of the display module when the housing and the two buckling components are inserted into the sunken portion on the display module.

According to the claimed invention, the supporting mechanism further includes a cover and at least one driving component. The cover is disposed on the display module and located in a position corresponding to the containing portion on the display module, and the cover is for covering the containing portion. The at least one driving component is connected to the cover, and the at least one driving component is for pushing the cover outside of the containing portion when the housing does not press the cover, such that the cover covers the containing portion.

According to the claimed invention, the at least one driving component is a spring.

According to the claimed invention, the supporting mechanism further includes at least one spring arm and at least one pushing component. The at least one spring arm is movably disposed inside the base. The at least one pushing component is disposed on at least one side of the base and connected to the at least one spring arm. The at least one pushing component is for pushing the at least one spring arm when the buckling structure is contained inside a containing portion on the base, such that the at least one spring arm pushes the at least one buckling component to separate from the at least one fastening portion of the display module.

According to the claimed invention, the display module includes two fastening portions. The buckling structure includes two buckling components movably installed on two sides of the housing. The bucking structure includes two resilient components respectively connected the two buckling components. Each of the resilient components drives the corresponding buckling component to buckle the fastening portion of the display module when the housing and the two buckling components are inserted into the containing portion on the display module. The supporting mechanism includes two spring arms movably disposed inside the base, respectively. The supporting mechanism includes two pushing components disposed on two sides of the base and connected to the two spring arms, respectively. Each of the pushing components is for pushing the corresponding spring arm when the buckling structure is contained inside the containing portion on the base, such that the two spring arms push the two buckling components to separate from the two fastening portions of the display module.

According to the claimed invention, a portable electronic device includes a base, a display module and a supporting mechanism. A containing portion is formed on the base. The display module is detachably combined with the base. A containing portion is formed on the display module, and the display module includes at least one fastening portion. The supporting mechanism is for supporting the display module on the base, and the supporting mechanism includes a stand and a buckling structure. An end of the stand is pivoted to the base, and the buckling structure is pivoted to the other end of the stand for buckling the display module. The buckling structure includes a housing, at least one buckling component and at least one resilient component. The housing is pivoted to the other end of the stand. The at least one buckling component is movably installed in the housing. The at least one resilient component is installed inside the housing and connected to the at least one buckling component. The at least one resilient component drives the at least one buckling component to buckle a fastening portion of the display module when the housing and the at least one buckling component are inserted into a containing portion on the display module.

In summary, the present invention can improve an issue of portability of the tablet computer with the conventional fixing type due to that the base is incapable of being separated from the tablet computer, and thus the present invention provides the supporting mechanism capable of facilitating separability and combination for supporting the display module on the base.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
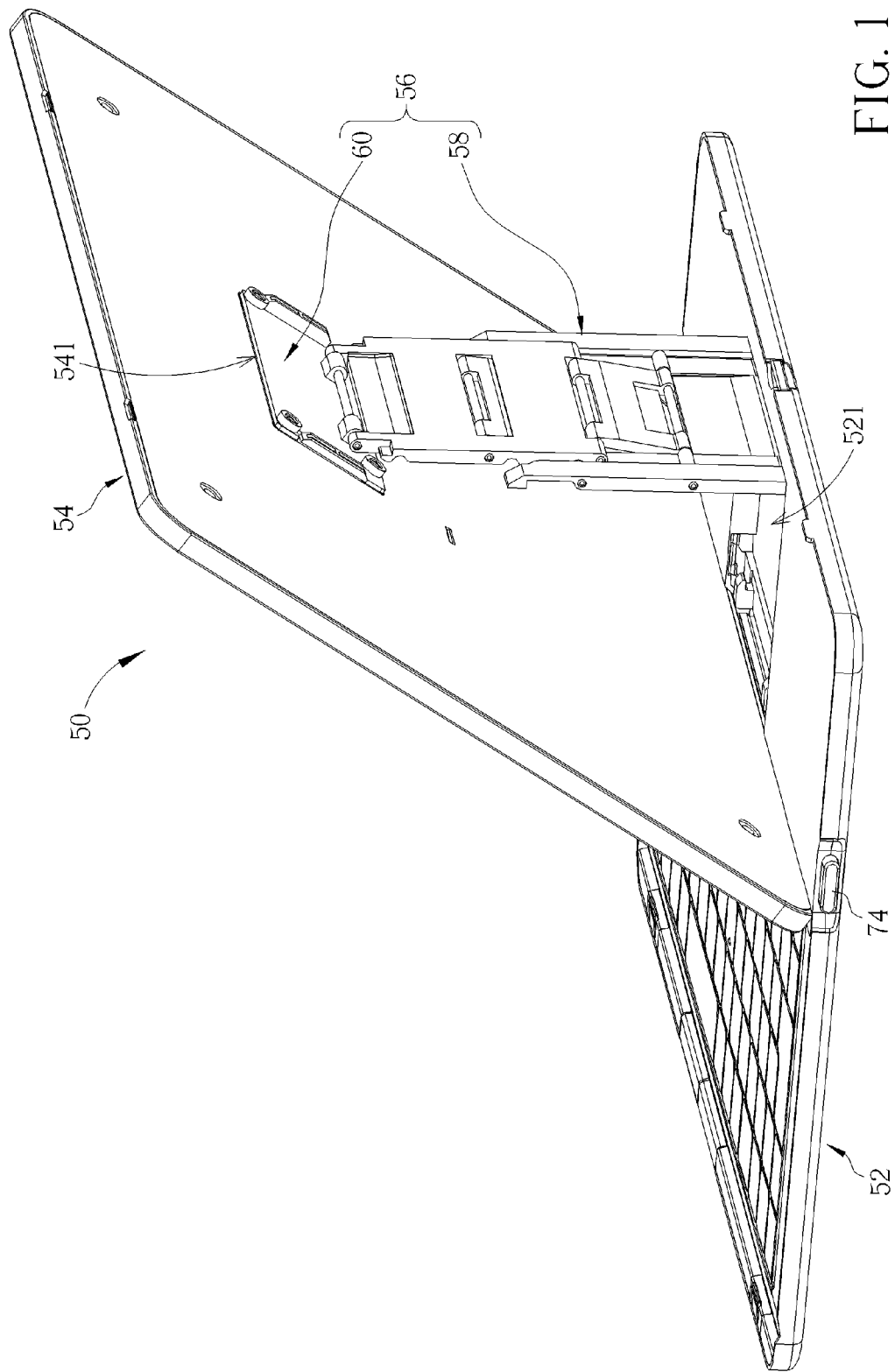
FIG. 1 and FIG. 2 are respectively diagrams of a portable electronic device in different statuses according to an embodiment of the present invention.
Figure 2:
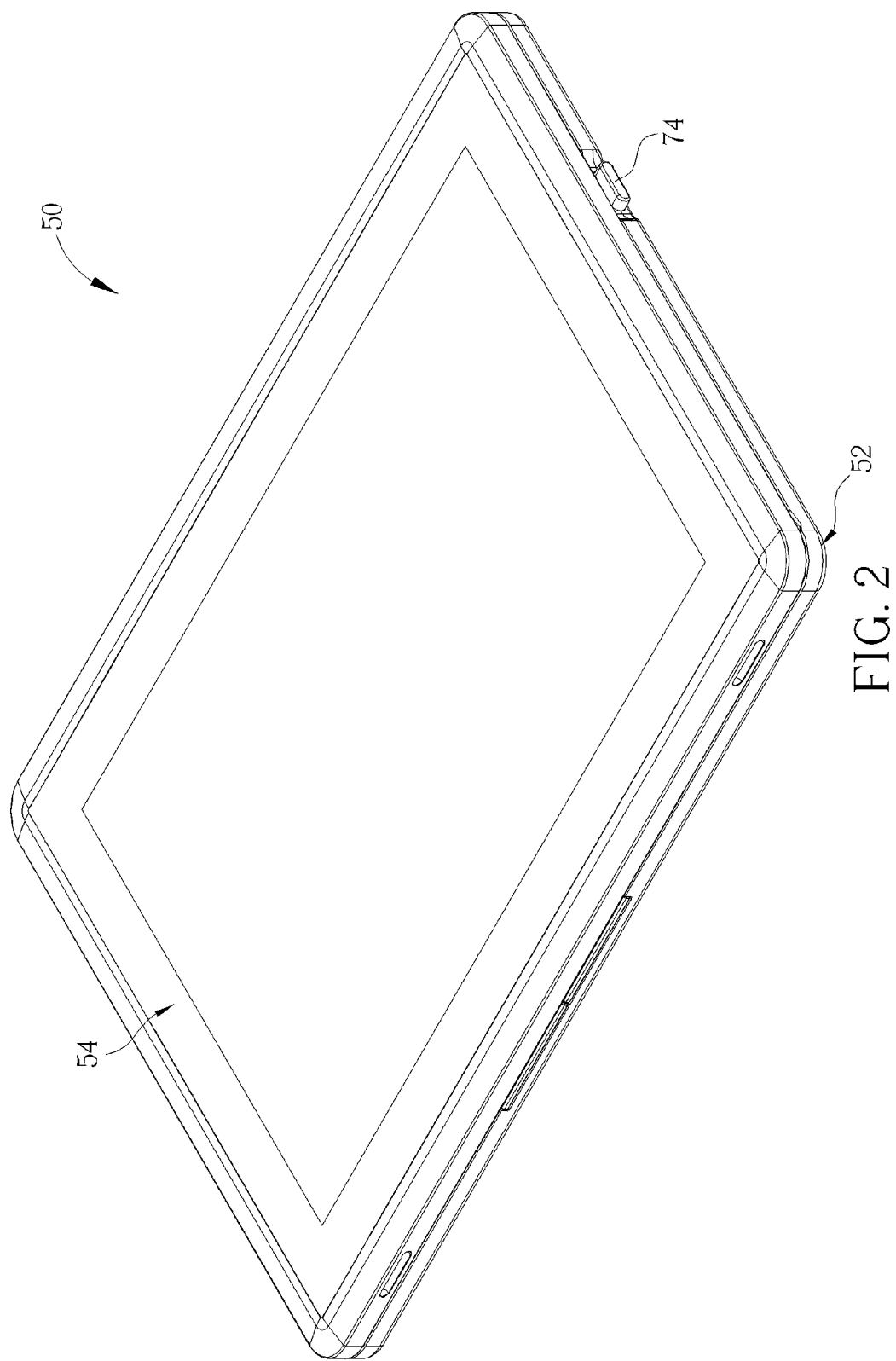

Please refer to FIG. 1 and FIG. 2. FIG. 1 and FIG. 2 are respectively diagrams of a portable electronic device 50 in different statuses according to an embodiment of the present invention. The portable electronic device 50 can be a portable computer device with dual modes of notebook computer and tablet computer. The portable electronic device 50 includes a base 52 equipped with input interfaces, such as a keyboard and so on. A containing portion 521 is formed on the base 52. The portable electronic device 50 further includes a display module 54 rotable relative to the base 52. The display module 54 is disposed on a side of the base 52 and detachably combined with the base 52. A containing portion 541 is formed on the display module 54. The display module 54 can be a tablet computer equipped with a touch panel, i.e. a user can utilize the display module 54 to perform a touch control instruction. The portable electronic device 50 further includes a supporting mechanism 56 for supporting the display module 54 on the base 52. The supporting mechanism 56 includes a stand 58 and a buckling structure 60. The stand 58 can be a foldable mechanism and an end of the stand 58 is pivoted to the base 52. The buckling structure 60 is pivoted to the other end of the stand 58 for buckling the display module 54. As shown in FIG. 1, the display module 54 is rotated relative to the base 52 to be in an expanded status. In the meantime, the stand 58 of the supporting mechanism 56 can support the display module 54 on the base 52, such that the user can operate the portable electronic device 50 to perform the keyboard input as the notebook computer mode. On the other hand, as shown in FIG. 2, the display module 54 is rotated relative to the base 52 to be in an overlapped status. In the meantime, the supporting mechanism 56 is lapped and contained inside the containing portion 521 on the base 52. Since the display module 54 is overlapped over the base 52, the user can operate the portable electronic device 50 to perform the touch control instruction as the tablet computer mode.

Figure 3:
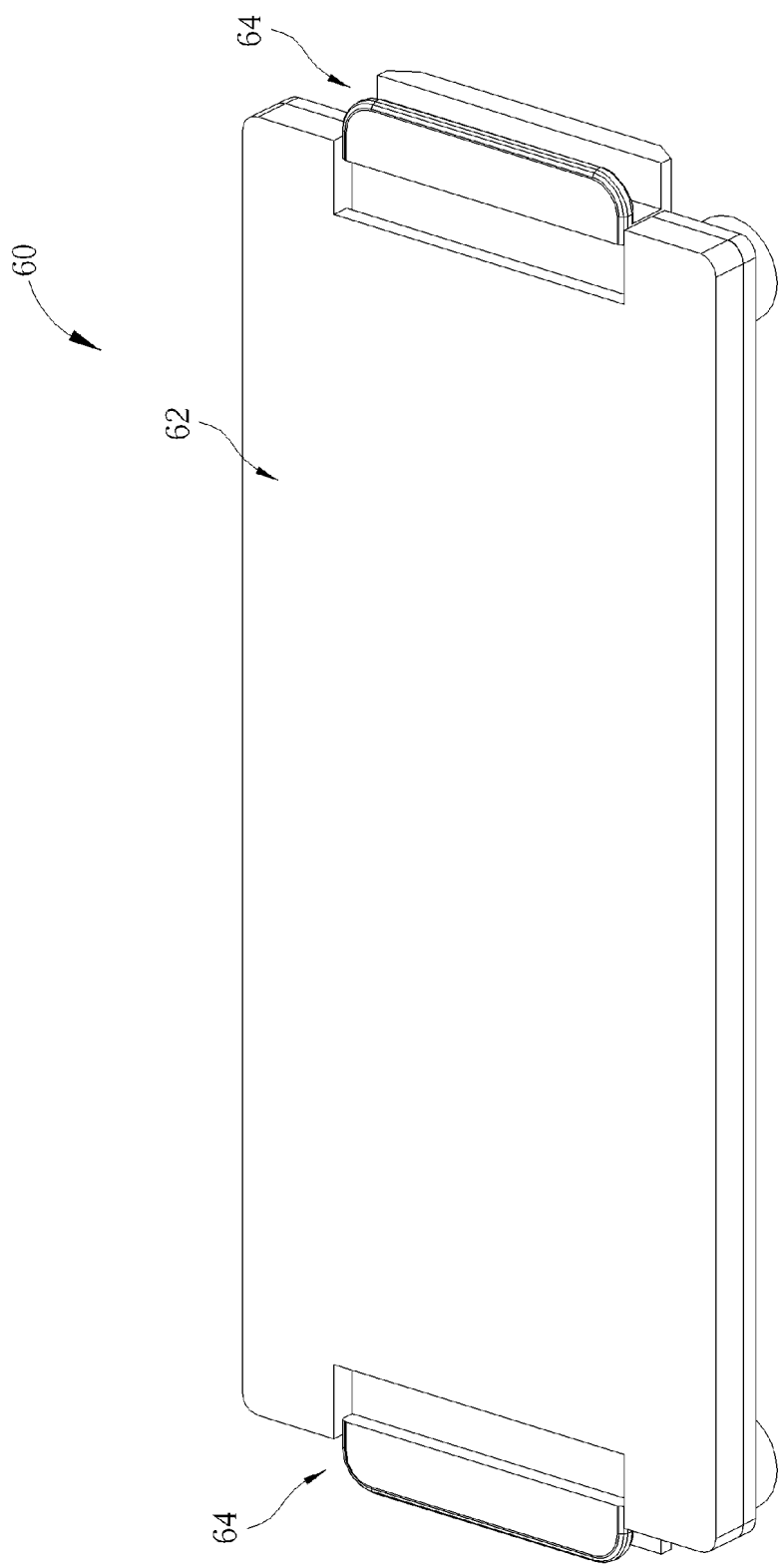
FIG. 3 to FIG. 5 are respectively a schematic diagram, an exploded diagram and an internal diagram of a buckling structure according to the embodiment of the present invention.
Figure 4:
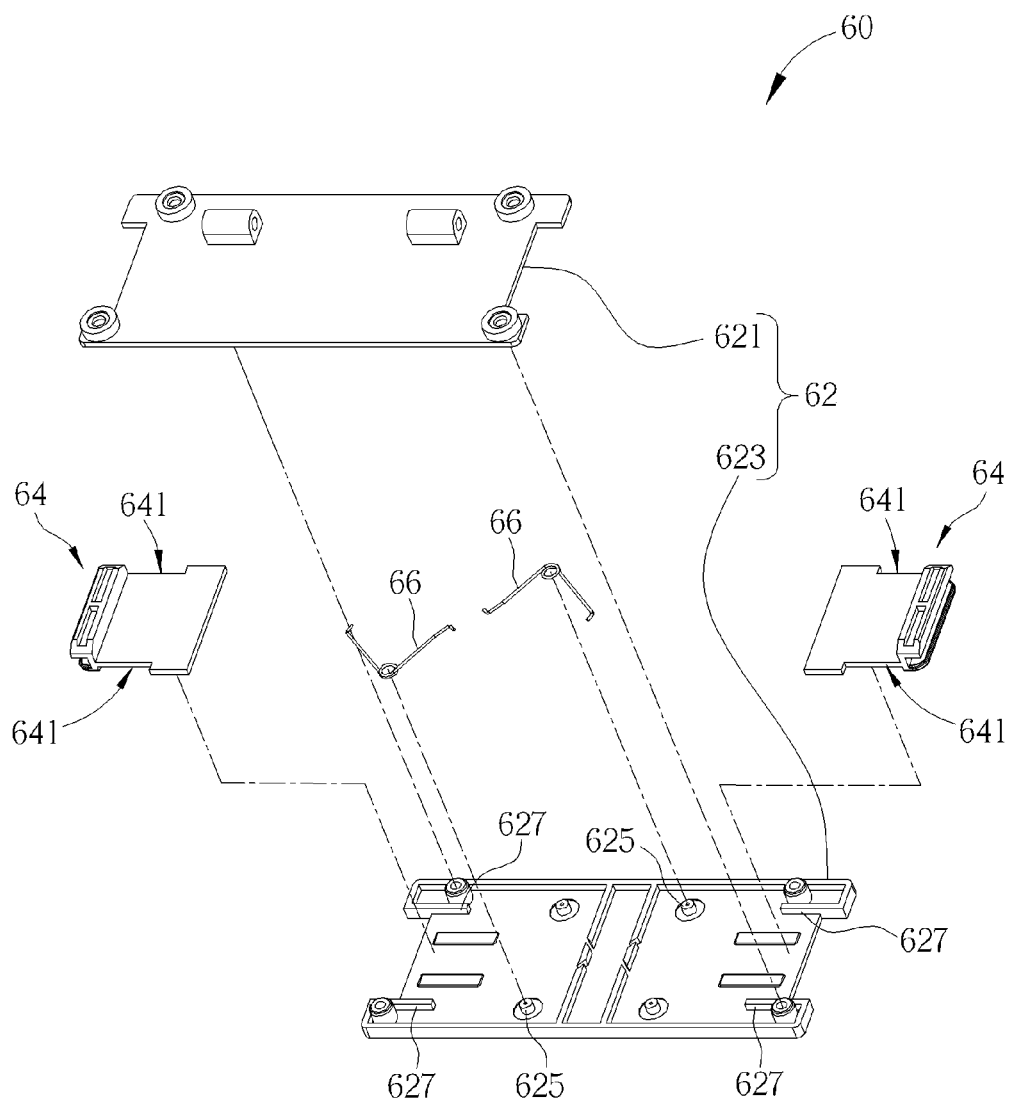
Figure 5:
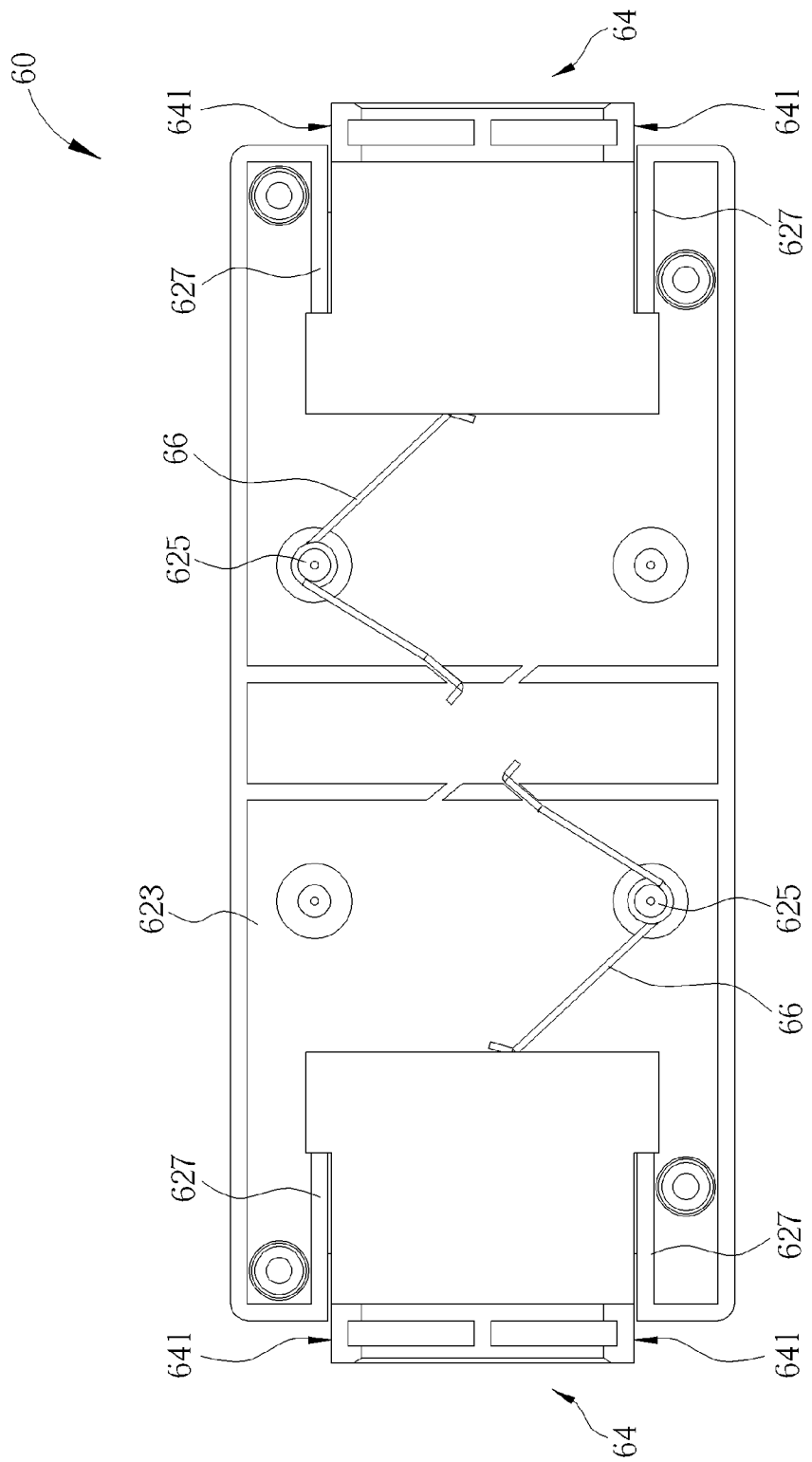

Please refer to FIG. 1, FIG. 3 to FIG. 5. FIG. 3 to FIG. 5 are respectively a schematic diagram, an exploded diagram and an internal diagram of the buckling structure 60 according to the embodiment of the present invention. The buckling structure 60 includes a housing 62 pivoted to the other end of the stand 58. The housing 62 can include a first housing body 621 and a second housing body 623. The first housing body 621 and the second housing body 623 are combined with each other, and the first housing body 621 is pivoted to the other end of the stand 58. At least one positioning post 625 and at least one guiding track 627 are disposed on the second housing body 623. The buckling structure 60 further includes two buckling components 64 movably installed on two sides of the housing 62, and at least one sliding slot 641 is formed on each of the buckling components 64. The guiding track 627 of the housing 62 is disposed inside the corresponding sliding slot 641 and is for guiding a movement of the buckling component 64, so as to prevent the buckling components 64 from separating from the housing 62. In this embodiment, a pair of the guiding tracks 627 is formed on each of the two sides of the second housing body 623, and a pair of the sliding slots 641 is formed on each of the two sides of the buckling components 64. An amount and disposal positions of the guiding track 627 and the sliding slot 641 are not limited to those mentioned in this embodiment, and it depends on practical demands. The buckling structure 60 further includes two resilient components 66 respectively connected to the two buckling components 64. The two resilient components 66 can be respectively a torsion spring with a bending portion sheathing on the positioning post 625 on an inner side of the housing 62, and two ends of the torsion spring are respectively fixed on the buckling components 64 and the inner side of the housing 62, i.e. the inner side of the second housing body 623. Accordingly, the two resilient components 66 can drive the buckling components 64 to move relative to the housing 62. There are two buckling components 64 and two resilient components 66 adopted in this embodiment. An amount and disposal positions of the buckling component 64 and the resilient component 66 are not limited to those mentioned in this embodiment, and it depends on practical demands.

Figure 6:
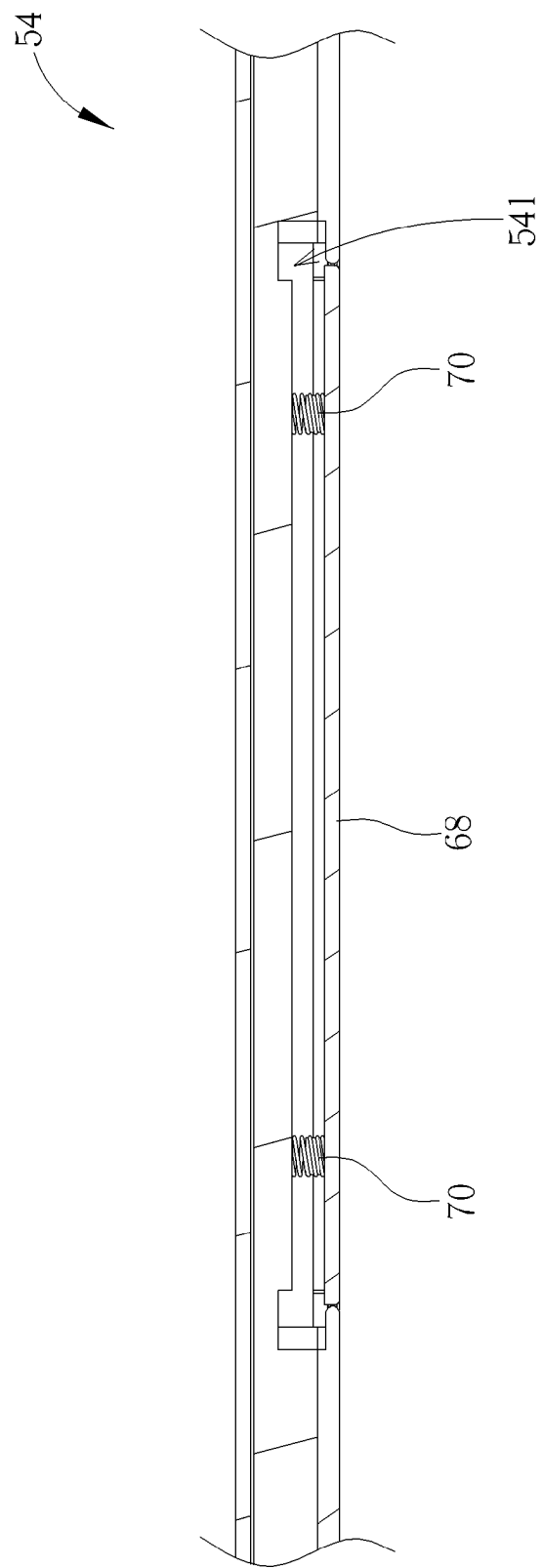
FIG. 6 and FIG. 7 are respectively internal structural diagrams illustrating that the buckling structure does not buckle a display module and the buckling structure buckles the display module according to the embodiment of the present invention.
Figure 7:
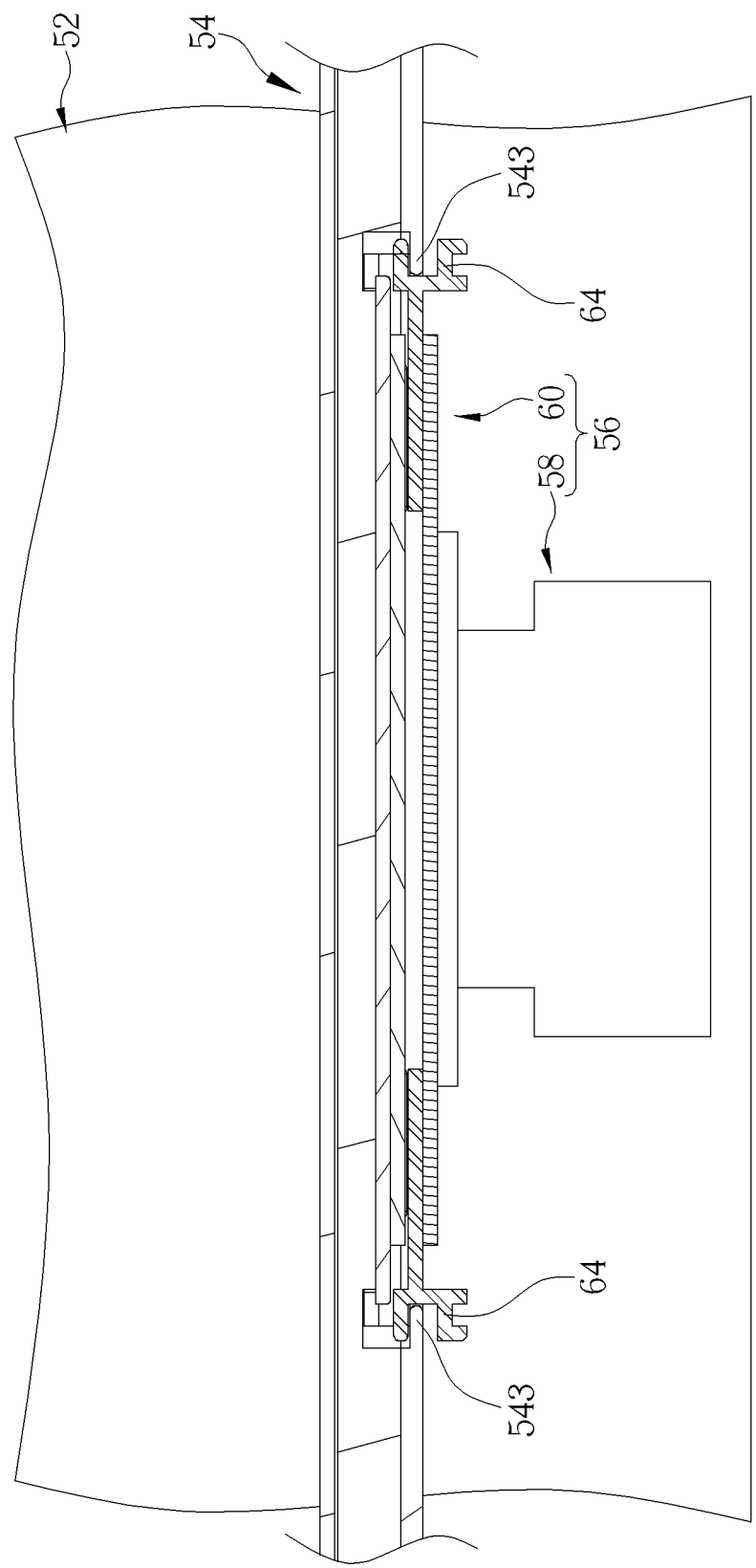
Figure 8:
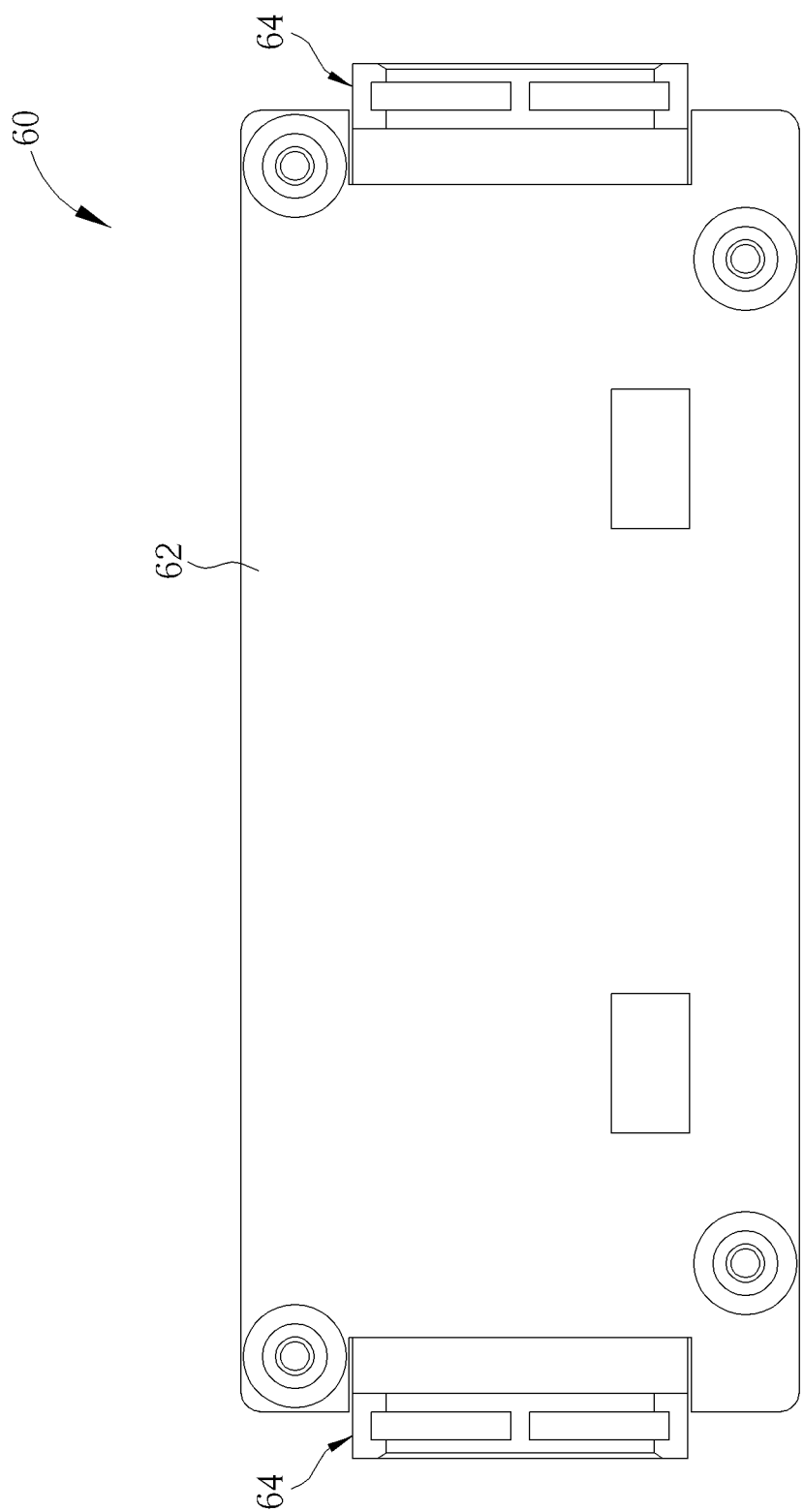
FIG. 8 and FIG. 9 are respectively diagrams illustrating that the buckling structure is not compressed and the buckling structure is compressed according to the embodiment of the present invention.
Figure 9:
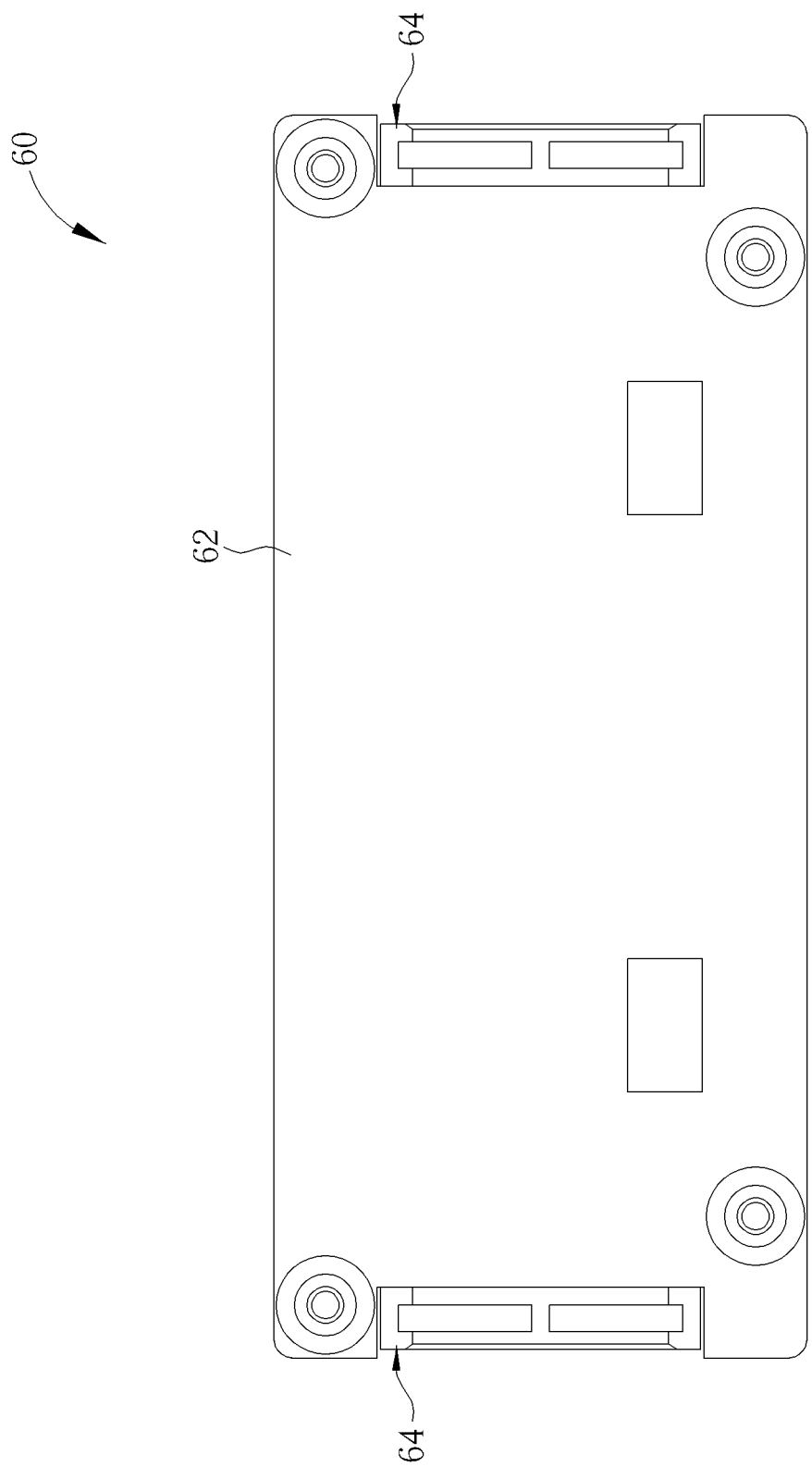

Please refer to FIG. 1, FIG. 5, FIG. 6 to FIG. 9. FIG. 6 and FIG. 7 are respectively internal structural diagrams illustrating that the buckling structure 60 does not buckle the display module 54 and the buckling structure 60 buckles the display module 54 according to the embodiment of the present invention. FIG. 8 and FIG. 9 are respectively diagrams illustrating that the buckling structure 60 is not compressed and the buckling structure 60 is compressed according to the embodiment of the present invention. The supporting mechanism 56 further includes a cover 68 and at least one driving component 70. The cover 68 is disposed on the display module 54 and located in a position corresponding to the containing portion 541 on the display module 54, and the cover 68 is for covering the containing portion 541, so as to maintain aesthetic feeling of appearance of the display module 54 and to prevent objects, such as dusts, from entering the containing portion 541. The driving component 70 is connected to the cover 68 and the driving component 70 can be a spring. As shown in FIG. 6, the driving component 70 is for pushing the cover 68 outside of the containing portion 64 when the housing 68 does not press the cover 68, i.e. without application of external force, such that the cover 68 covers the containing portion 541. In this embodiment, the supporting mechanism 56 includes two driving components 70 respectively connected to two sides of the cover 68. An amount and disposal positions of the driving component 70 are not limited to those mentioned in this embodiment. For example, the supporting mechanism 56 can include only one driving component 70 disposed in the central portion of the cover 68. As for which one of the aforesaid designs is adopted, it depends on practical demands.

In this embodiment, the containing portion 541 is a sunken portion. As shown in FIG. 8, when the buckling structure 60 does not buckle the display module 54, i.e. when the housing 62 and the buckling components 64 does not be inserted into the containing portion 541 (i.e. the sunken portion) on the display module 54, the resilient components 66 drives the buckling components 64 to partly protrude outside of the housing 62 since the buckling components 64 is not pushed by the external force. When the buckling structure 60 is desired to be buckled the display module 54, the two buckling components 64 of the buckling structure 60 are pressed by two fastening portions 543 of the display module 54, so as to compress the resilient components 66. In the meantime, the two buckling components 64 are contained into the housing 62, as shown in FIG. 9, until the fastening portions 543 of the display module 54 enter slots of the buckling components 64. Accordingly, the resilient components 66 can provide the buckling components 64 with a resilient force, such that the buckling components 64 buckle the fastening portions 543, as shown in FIG. 7. In the meantime, the supporting mechanism 56 can be combined with the display module 54 firmly. On the other hand, when the buckling structure 60 is desired to be released from the display module 54, the two buckling components 64 are pressed inwardly toward each other, such that the buckling components 64 separates from the fastening portions 543. In such a manner, the buckling structure 60 can be separated from the containing portion 541 (i.e. the sunken portion) on the display module 54. As a result, the display module 54 can be utilized independently.

Figure 10:
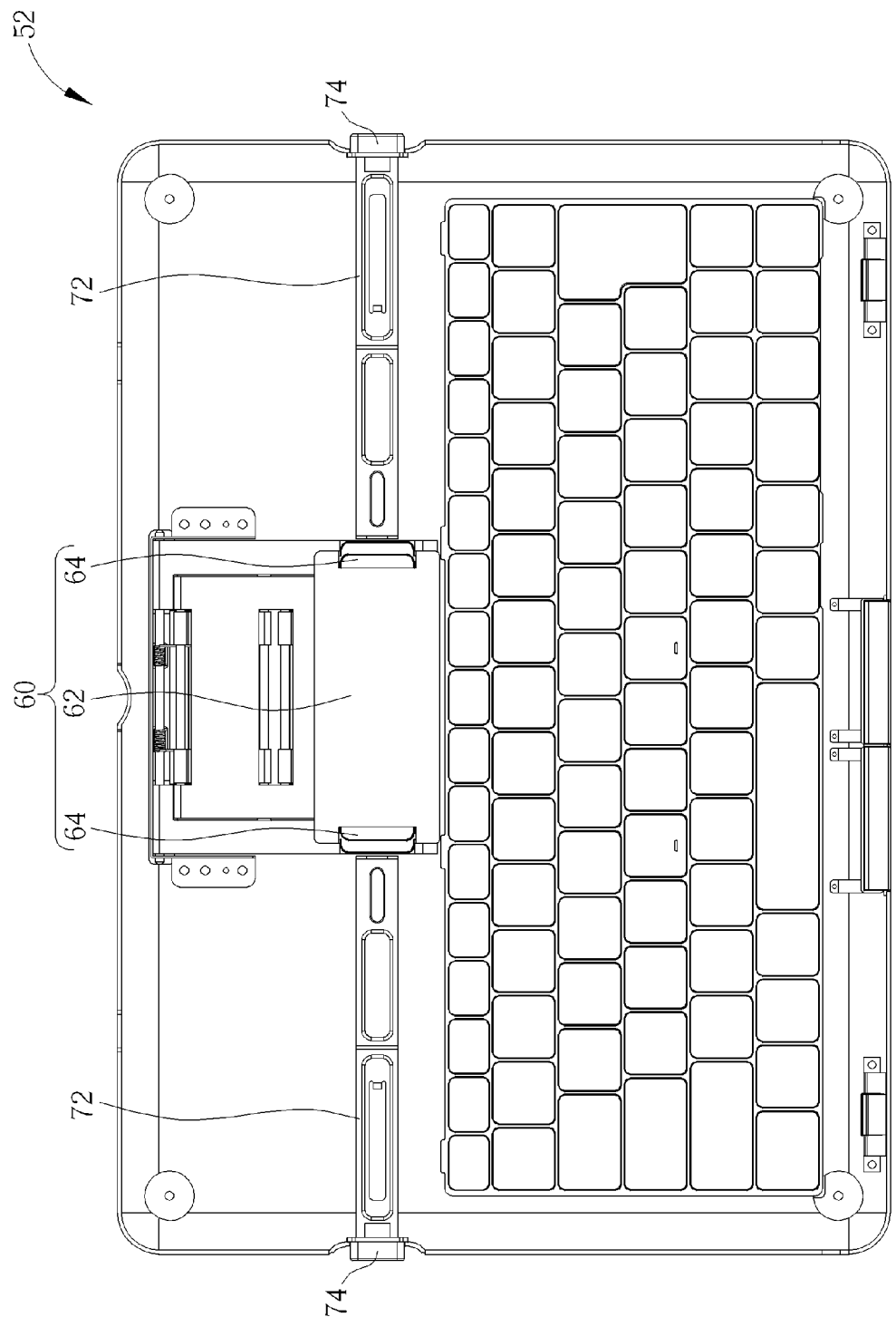
FIG. 10 is an internal diagram of a base according to the embodiment of the present invention.
Figure 11:
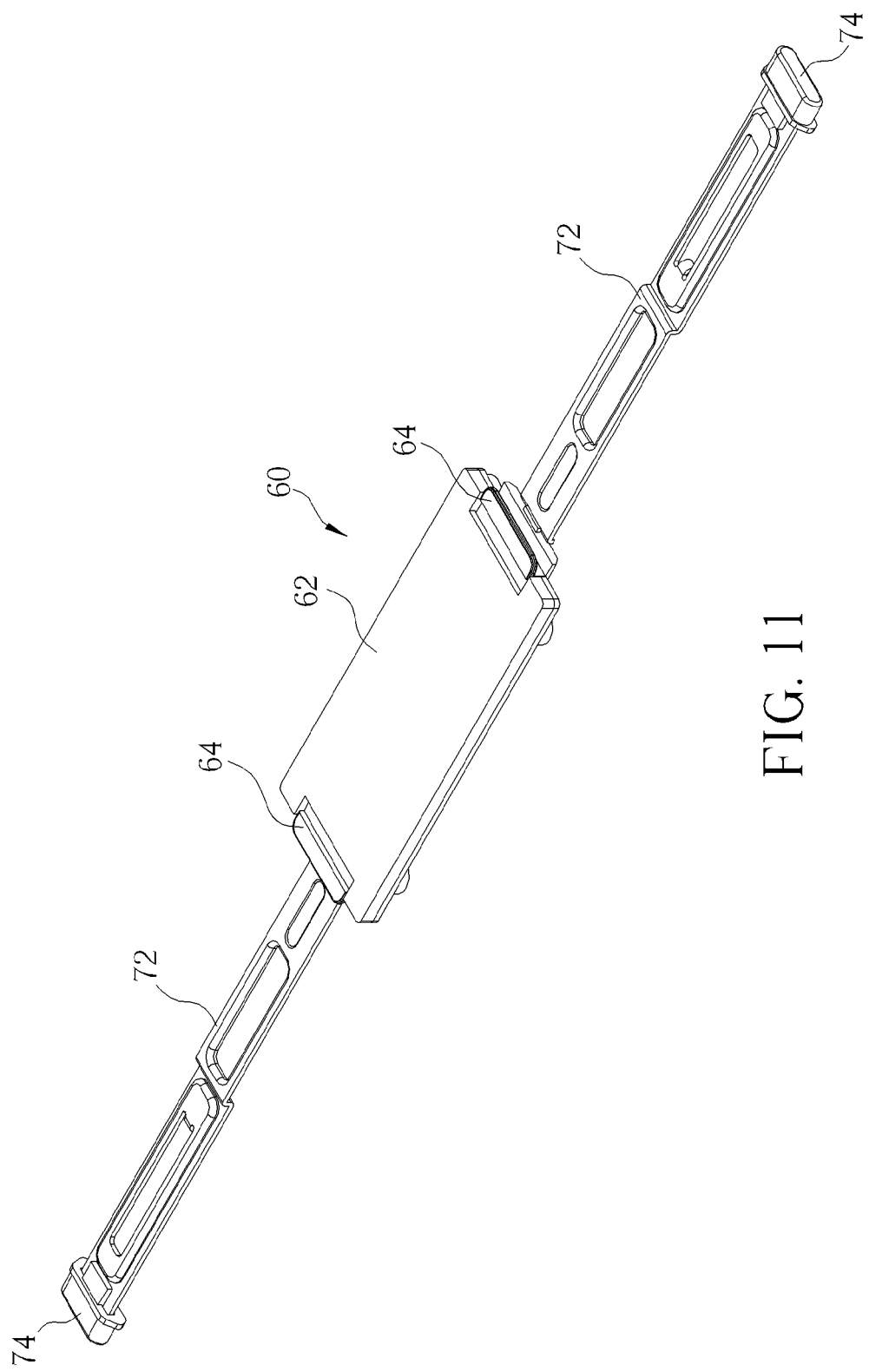
FIG. 11 is a diagram illustrating that a spring arm and a pushing component are combined with the buckling structure according to the embodiment of the present invention.
Figure 12:
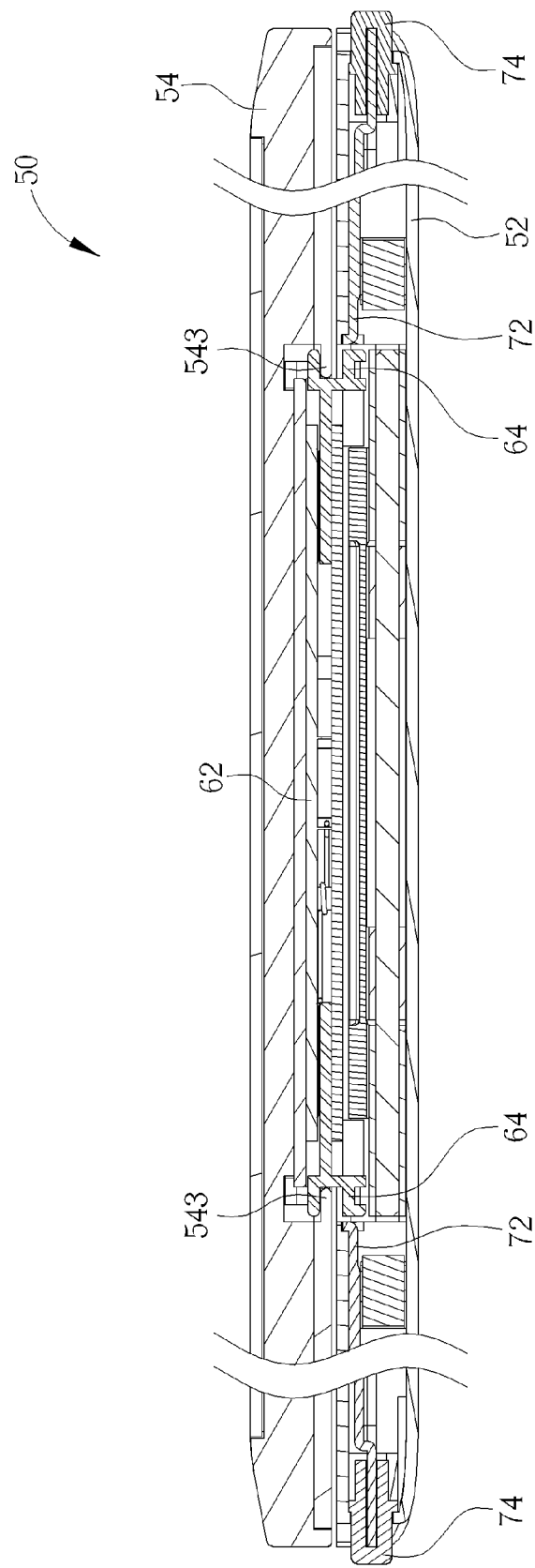
FIG. 12 and FIG. 13 are respectively internal structural diagrams illustrating that the display module is lapped over the base in different statues according to the embodiment of the present invention.
Figure 13:
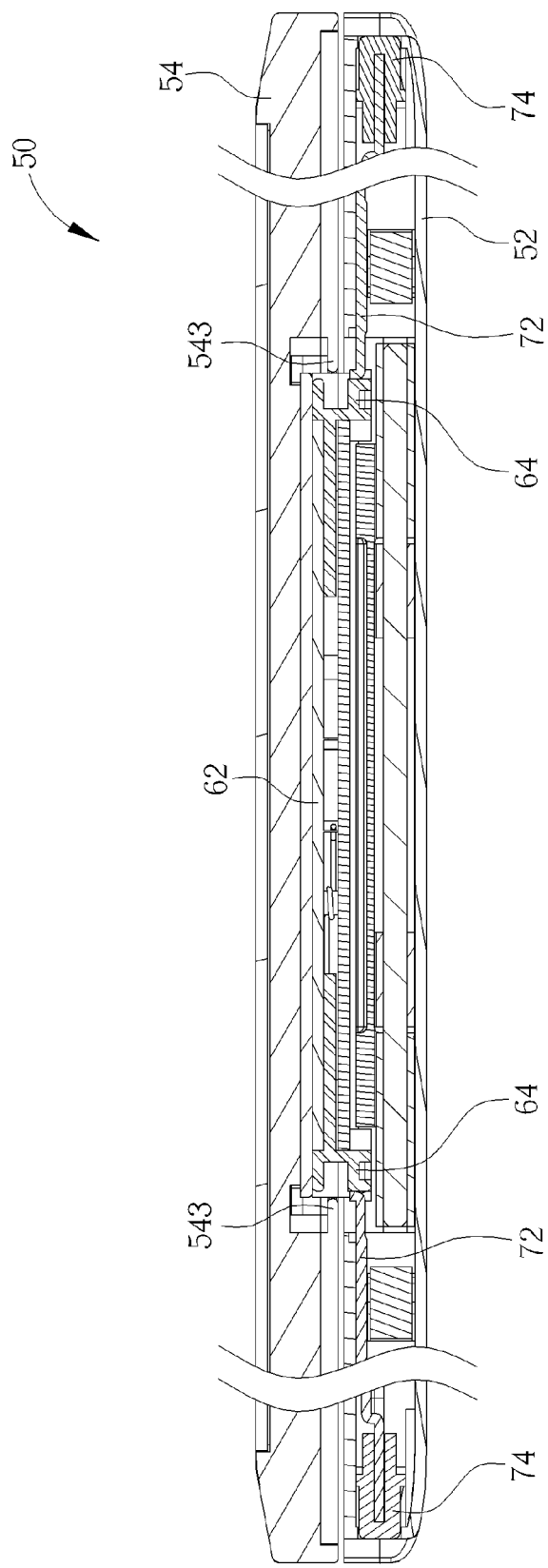

Furthermore, the release mechanism for releasing the buckling structure 60 and the display module 54 of the present invention can be disposed on the base 52. In other words, when the display module 54 is rotated relative to the base 52 to be in the overlapped status shown in FIG. 2, the release mechanism can be additionally disposed on the base 52 for releasing the buckling structure 60 and the display module 54, so as to solve an issue that the buckling components 64 can not be pressed manually for separating the buckling components 64 from the fastening portions 543. Please refer to FIG. 10. FIG. 10 is an internal diagram of the base 52 according to the embodiment of the present invention. The supporting mechanism 56 further includes at least one spring arm 72 movably disposed inside the base 52, and the supporting mechanism 56 further includes at least one pushing component 74 disposed on at least one side of the base 52 and connected to the at least one spring arm 72. Please refer to FIG. 10 and FIG. 11. FIG. 11 is a diagram illustrating that the spring arm 72 and the pushing component 74 are combined with the buckling structure 60 according to the embodiment of the present invention. In this embodiment, the supporting mechanism 56 includes two spring arms 72 and two pushing components 74. The two spring arms 72 are respectively disposed on two sides of the buckling structure 60, and the two pushing components 74 are disposed on two sides of the base 52 and connected to the two spring arms 72. An amount and disposal positions of the spring arm 72 and the pushing component 74 are not limited to those mentioned in this embodiment, and it depends on practical demands. Please refer to FIG. 12 and FIG. 13. FIG. 12 and FIG. 13 are respectively internal structural diagrams illustrating that the display module 54 is lapped over the base 52 in different statuses according to the embodiment of the present invention. When the display module 54 is rotated relative to the base 52 to the overlapped status, the buckling structure 60 is contained inside the containing portion 521 on the base 52. As shown in FIG. 12, the buckling components 64 buckle the fastening portions 543, such that the display module 54 is combined with the base 52. When the display module 54 in the status shown in FIG. 12 is desired to be separated from the buckling structure 60, the two pushing components 74 protruding from two sides of the base 52 are pressed inwardly toward each other, so as to push the two spring arms 72 to move inwardly. Accordingly, the two spring arms 72 respectively push the two buckling components 64 to separate from the two fastening portions 543 of the display module 54. In such a manner, the buckling mechanism between the buckling structure 60 and the display module 54 is released, and thus the display module 54 can be utilized independently. It can be achieved in a manually manner or by utilizing a resilient component to recover the spring arm 72 and the pushing component 74 to a position shown in FIG. 12. Alternatively, recovery effect can also be achieved by utilizing the buckling components 64 to push the spring arm 72 outwardly for pushing the pushing component 74 to protrude from the two sides of the base 52 when the buckling structure 60 is again contained inside the containing portion 521 of the base 52.

Compared to the prior art, the present invention can improve an issue of portability of the tablet computer with the conventional fixing type due to that the base is incapable of being separated from the tablet computer, and thus the present invention provides the supporting mechanism capable of facilitating separability and combination for supporting the display module on the base.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting mechanism for supporting a display module on a base, the display module comprising at least one fastening portion, the supporting mechanism comprising:
   a stand with an end being pivoted to the base; and
   a buckling structure pivoted to the other end of the stand for detachably buckling the display module, the buckling structure and the display module being detachably connected to each other, the buckling structure comprising:
      a housing pivoted to the other end of the stand;
      at least one buckling component movably installed in the housing; and
      at least one resilient component installed inside the housing and connected to the at least one buckling component, the at least one resilient component driving the at least one buckling component to buckle the at least one fastening portion of the display module when the housing and the at least one buckling component are inserted into a containing portion on the display module;
      wherein the display module is used as a tablet computer independently after being detached from the stand.

2. The supporting mechanism of claim 1, wherein at least one narrow portion is formed on the at least one buckling component, and the housing comprises at least one guiding track disposed inside the at least one narrow portion for guiding a movement of the at least one buckling component.

3. The supporting mechanism of claim 1, wherein the at least one resilient component is a torsion spring with a bending portion sheathing on a positioning post on an inner side of the housing, and two ends of the torsion spring are respectively fixed on the at least one buckling component and the inner side of the housing.

4. The supporting mechanism of claim 1, wherein a number of the at least one fastening portion is two, the buckling structure comprises two buckling components movably installed on two sides of the housing, the buckling structure comprises two resilient components respectively connected to the two buckling components, the containing portion on the display module is a sunken portion, and each of the resilient components drives the corresponding buckling component to buckle the two fastening portions of the display module when the housing and the two buckling components are inserted into the sunken portion on the display module.

5. The supporting mechanism of claim 1, further comprising:
   a cover disposed on the display module and located in a position corresponding to the containing portion on the display module, the cover being for covering the containing portion on the display module; and
   at least one driving component connected to the cover, the at least one driving component being for pushing the cover outside of the containing portion on the display module when the housing does not press the cover, such that the cover covers the containing portion on the display module.

6. The supporting mechanism of claim 5, wherein the at least one driving component is a spring.

7. The supporting mechanism of claim 1, further comprising:
   at least one spring arm movably disposed inside the base; and
   at least one pushing component disposed on at least one side of the base and connected to the at least one spring arm, the at least one pushing component being for pushing the at least one spring arm when the buckling structure is contained inside a containing portion on the base, such that the at least one spring arm pushes the at least one buckling component to separate from the at least one fastening portion of the display module.

8. The supporting mechanism of claim 7, wherein the display module comprises two fastening portions, the buckling structure comprises two buckling components movably installed on two sides of the housing, the buckling structure comprises two resilient components respectively connected the two buckling components, each of the resilient components drives the corresponding buckling component to buckle the fastening portion of the display module when the housing and the two buckling components are inserted into the containing portion on the display module, the supporting mechanism comprises two spring arms movably disposed inside the base, respectively, the supporting mechanism comprises two pushing components disposed on two sides of the base and connected to the two spring arms, respectively, and each of the pushing components is for pushing the corresponding spring arm when the buckling structure is contained inside the containing portion on the base, such that the two spring arms push the two buckling components to separate from the two fastening portions of the display module.

9. A portable electronic device, comprising:
   a base whereon a containing portion is formed;
   a display module detachably combined with the base, a containing portion being formed on the display module, and the display module comprising at least one fastening portion; and
   a supporting mechanism for supporting the display module on the base, the supporting mechanism comprising:
      a stand with an end pivoted to the base; and
      a buckling structure pivoted to the other end of the stand for detachably buckling the display module, the buckling structure and the display module being detachably connected to each other, the buckling structure comprising:
         a housing pivoted to the other end of the stand;
         at least one buckling component movably installed in the housing; and
         at least one resilient component installed inside the housing and connected to the at least one buckling component, the at least one resilient component driving the at least one buckling component to buckle the fastening portion of the display module when the housing and the at least one buckling component are inserted into the containing portion on the display module;
      wherein the display module is used as a tablet computer independently after being detached from the stand.

10. The portable electronic device of claim 9, wherein at least one narrow portion is formed on the at least one buckling component, and the housing comprises at least one guiding track disposed inside the at least one narrow portion for guiding a movement of the at least one buckling component.

11. The portable electronic device of claim 9, wherein the at least one resilient component is a torsion spring with a bending portion sheathing on a positioning post on an inner side of the housing, and two ends of the torsion spring are respectively fixed on the at least one buckling component and the inner side of the housing.

12. The portable electronic device of claim 9, wherein a number of the at least one fastening portion is two, the buckling structure comprises two buckling components movably installed on two sides of the housing, the buckling structure comprises two resilient components respectively connected to the two buckling components, the containing portion on the display module is a sunken portion, and each of the resilient components drives the corresponding buckling component to buckle the two fastening portions of the display module when the housing and the two buckling components are inserted into the sunken portion on the display module.

13. The portable electronic device of claim 9, wherein the supporting mechanism further comprises:
   a cover disposed on the display module and located in a position corresponding to the containing portion on the display module, the cover being for covering the containing portion on the display module; and
   at least one driving component connected to the cover, the at least one driving component being for pushing the cover outside of the containing portion on the display module when the housing does not press the cover, such that the cover covers the containing portion on the display module.

14. The portable electronic device of claim 13, wherein the at least one driving component is a spring.

15. The portable electronic device of claim 9, wherein the supporting mechanism further comprises:
   at least one spring arm movably disposed inside the base; and
   at least one pushing component disposed on at least one side of the base and connected to the at least one spring arm, the at least one pushing component being for pushing the at least one spring arm when the buckling structure is contained inside the containing portion on the base, such that the at least one spring arm pushes the at least one buckling component to separate from the at least one fastening portion of the display module.

16. The portable electronic device of claim 15, wherein the display module comprises two fastening portions, the buckling structure comprises two buckling components movably installed on two sides of the housing, the buckling structure comprises two resilient components respectively connected the two buckling components, each of the resilient components drives the corresponding buckling component to buckle the fastening portion of the display module when the housing and the two buckling components are inserted into the containing portion on the display module, the supporting mechanism comprises two spring arms movably disposed inside the base, respectively, the supporting mechanism comprises two pushing components disposed on two sides of the base and connected to the two spring arms, respectively, and each of the pushing components is for pushing the corresponding spring arm when the buckling structure is contained inside the containing portion on the base, such that the two spring arms push the two buckling components to separate from the two fastening portions of the display module.

* * * * *